United States Patent [19]

Holding et al.

[11] 4,325,900

[45] Apr. 20, 1982

[54] MANUFACTURE OF BRUSHES

[75] Inventors: David Holding, Bolton; John D. Chancellor, Mickleover, both of England

[73] Assignee: Schlegel (UK) Limited, Leeds, England

[21] Appl. No.: 165,789

[22] Filed: Jul. 3, 1980

[51] Int. Cl.³ .............................................. B29D 31/00
[52] U.S. Cl. ................................. 264/103; 264/146; 264/157; 264/167; 264/174; 264/243; 264/295; 300/21
[58] Field of Search ............... 425/805; 264/243, 248, 264/103, 146, 174, 157, 167, 295; 300/19, 21

[56] References Cited

U.S. PATENT DOCUMENTS

| | | | |
|---|---|---|---|
| 2,294,480 | 9/1942 | Rohweder et al. | 300/21 |
| 2,400,809 | 5/1946 | Cave | 300/21 |
| 2,812,214 | 11/1957 | Sandelin | 425/805 |
| 2,980,467 | 4/1961 | Lechene | 300/21 |
| 3,351,387 | 11/1967 | Lechene | 300/21 |
| 3,626,509 | 12/1971 | Rones | 300/21 |
| 4,133,147 | 1/1979 | Swift, Jr. | 300/21 |

FOREIGN PATENT DOCUMENTS

| | | | |
|---|---|---|---|
| 829256 | 3/1938 | France | 300/21 |
| 52-41461 | 3/1977 | Japan | 300/21 |
| 1457074 | 12/1976 | United Kingdom . | |

*Primary Examiner*—James B. Lowe
*Attorney, Agent, or Firm*—Cumpston & Shaw

[57] ABSTRACT

A method of manufacturing brush components and the brushes themselves is disclosed, wherein a woven brush fabric is formed, the wefts being provided by tows made up of a plurality of bristle filaments, for example polypropylene mono-filaments, and the warps being made up of polyester yarn, the woven material subsequently having beads of molten polymeric material extruded therein, transverse to the wefts and being slit transverse to the wefts, either before or after the extrusion operation, thus providing a plurality of brush tapes or components which can then be assembled into a holder either on their own or together with other strips, using the extruded polymeric material as a locking bead engaging in a groove in the holder.

Preferably, before or during the extrusion step, the fabric is heated to at least soften it, and preferably fuse the filaments together, in the vicinity of the extruded beads. It is also envisaged that heating without extrusion could be used. Once the components have been formed, the warps can be removed by simply pulling them out.

11 Claims, 7 Drawing Figures

MANUFACTURE OF BRUSHES

This invention relates to an improved method of manufacturing brushes and to brushes and the brush components made by the improved method.

In our U.K. Pat. No. 1,457,074 a method of manufacturing brush components is disclosed wherein a knitted tape of yarn folded upon itself into a zig-zag is converted into brush components by having a locking element secured to an edge thereof either before or after a slitting operation. In our co-pending British Application No. 7,901,230, further methods of brush manufacture are disclosed wherein bristle elements are advanced through endless draw-off belts, locking beads are extruded on the bristle elements and a folding or slitting operation is performed.

In U.S. Pat. No. 2,812,214, a method of manufacturing brush strips is disclosed wherein an organic material is heated to plastic state and is extruded through a mouthpiece into a continuous U-shaped strip through a groove-shaped guide member, whereupon a plurality of aligned bristles are conveyed by means of an endless belt together with a thread of metal and are folded around a guide cam and led into the open topped guide member. The guide member has a tapering slot in its upper surface at the bristle feed-in location, and as the bristles are advanced and the U-shaped strip is pulled out of the guide member, so the bristles are folded with their ends upwards by the narrowing slot and pressed down into the U-shaped strip. In this way, the side walls of the U-shaped strip are pressed against the bristles which are partly pressed into the soft material of the strip and held therein. It is preferred that the strip is cooled on emergence from the extruder so that it maintains its shape better.

Brush strips made in accordance with the above teachings are wholly unsatisfactory in that, due to the low temperature of the U-shaped strip, the bristles are only pressed into its surface and cannot even form a satisfactory mechanical key with the strip. This means that after a few uses, the bristles tend to fall out of the strip.

We have now developed a further method of brush manufacture employing a weaving operation.

According to the present invention, we provide a method of manufacturing brush components comprising forming a multi-filament tow from synthetic resinous bristle filaments, feeding the tow to a loom as the weft, and weaving a bristle fabric using traditional warp yarns, heating the tow as it is fed into the extruder causing the bristle filaments to soften or melt, and subsequently extruding onto the fabric across the bristle wefts a polymeric material either before or after the material has been slit across the wefts whereby the bristle filaments and extruded polymeric material are fused together.

Preferably, the multi-filament tow is formed from a plurality of synthetic resinous mono-filaments such as polypropylene filaments and the warp yarns are formed from a polyester material.

According to one embodiment of the invention, after the weaving operation, the woven material is slit transverse to the wefts and molten plastics material is then extruded onto one or both ends of the severed wefts, the shape of the extrusion being such as to provide a locking bead which can subsequently be located in a groove in a brush head. If the molten material is extruded down both end edges of the severed wefts then a further severing operation between the two extrusions must be performed.

In an alternative method, after the slitting operation the slit strip of woven material can be folded upon itself about its central line running transverse to the wefts, thus presenting a double row of weft ends side by side and the material may be held in this doubled over configuration by extruding a bead of polymeric material along the fold line.

In a yet further alternative method, the woven material may have deposited on one or both faces thereof strips of molten polymer at selected points across the width of the woven tape, i.e. transverse to the wefts, to form brush beads. These strips of molten polymer may be equally spaced and the woven material can then be slit either between the strips of molten material and/or down the centre of the strips of molten material so as to provide several single or double brush components either of the same or different widths. If slitting occurs to either side of the molten strips, the slit strips of material can be bent upon themselves through 180° along the centre line of the strips of molten material so as to provide brush components of double thickness.

The brush components of the present invention can be manufactured on any suitable loom capable of handling tows or wefts of considerable bulk and a machine employing a single rapier which carries the weft across the full width of the loom may be used, or, alternatively, the weaving machine may be provided with two rapiers which transfer the weft from one to the other in the centre of the machine.

In one particular example of the invention, we manufactured brush components using a tow made up of 100 ends of 8 thou (0.20 mm) polypropylene filaments or weft yarns and a plurality of polyester warps, for example of Craven's 1000 denier 1½ twist/inch polyester.

The resultant woven material was then subsequently processed by carrying out one of the extrusion and slitting operations and, if necessary, a folding operation as described above to provide a plurality of lengths or strips of brush component having a length corresponding to that of the woven material.

Several embodiments of brush components manufactured in accordance with the invention are now described with reference to the accompanying drawings, in which.

Figure 1:
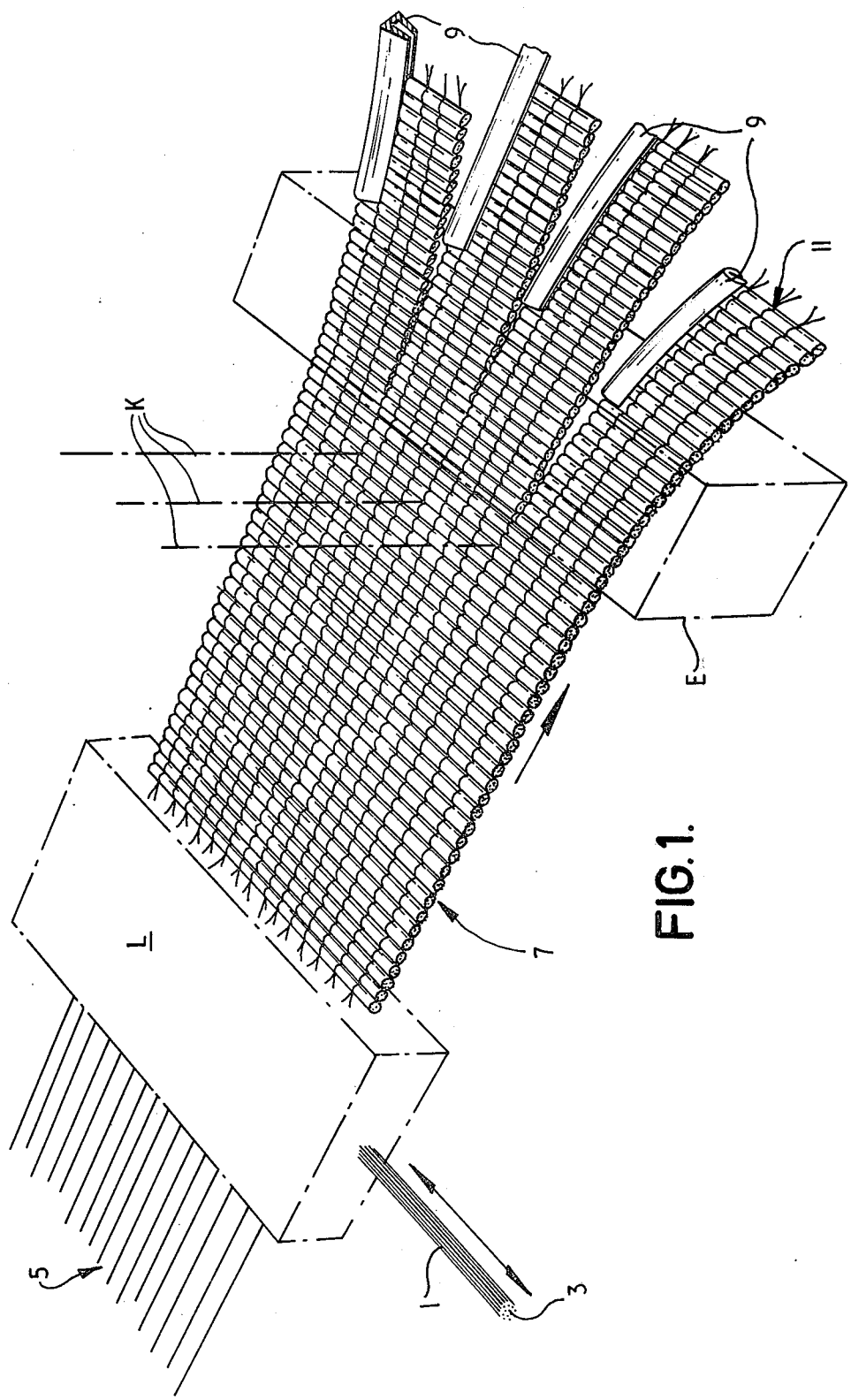
FIG. 1 is a perspective view of a woven bristle fabric, partly slit, and having extrusions applied to an edge of the slit portions.

Referring to FIG. 1, a multi-filament tow 1 formed of synthetic resinous bristle monofilaments 3 is fed to a loom L as a weft, and a plurality of warps 5 are fed to the loom L, so as to provide a woven bristle fabric 7. This fabric 7 is then fed into an extruder E, past slitting knives K, and beads of polymeric material 9 are extruded onto slit edges of the fabric. Within the extruder, the bristle filaments, in the vicinity of the extruder heads (not shown) are heated sufficient to fuse the bristle filaments together either immediately, before or during the extrusion step. As a result, four brush strips 11 emerge from the extruder, which can subsequently be cut to length, and the beads 9 located in suitable brush holders. The beads are suitably shaped for this purpose.

Figure 2:
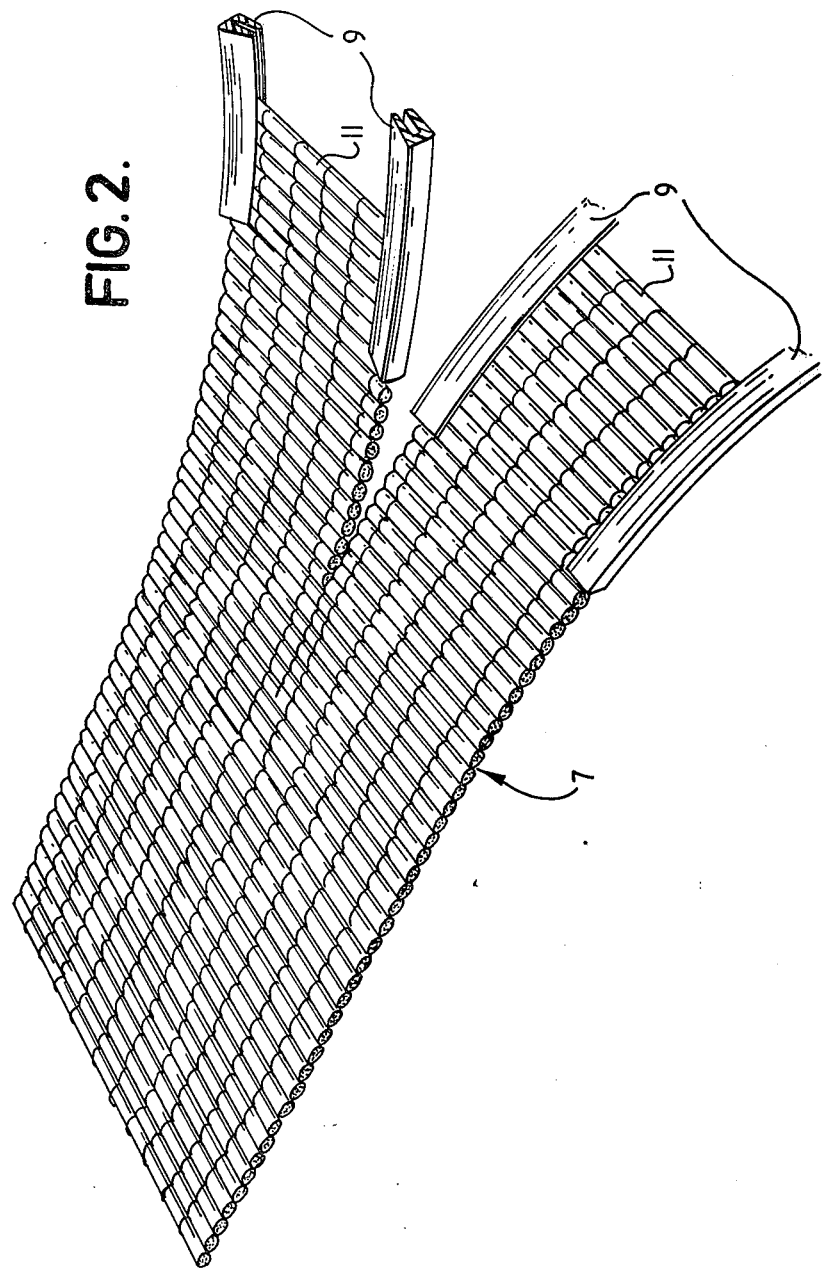
FIG. 2 is a view similar to FIG. 1, with extruder and slitter omitted, showing an alternative embodiment.

In the embodiment of FIG. 2, the fabric 7 is slit into two, and beads 9 are extruded onto each edge.

Figure 3:
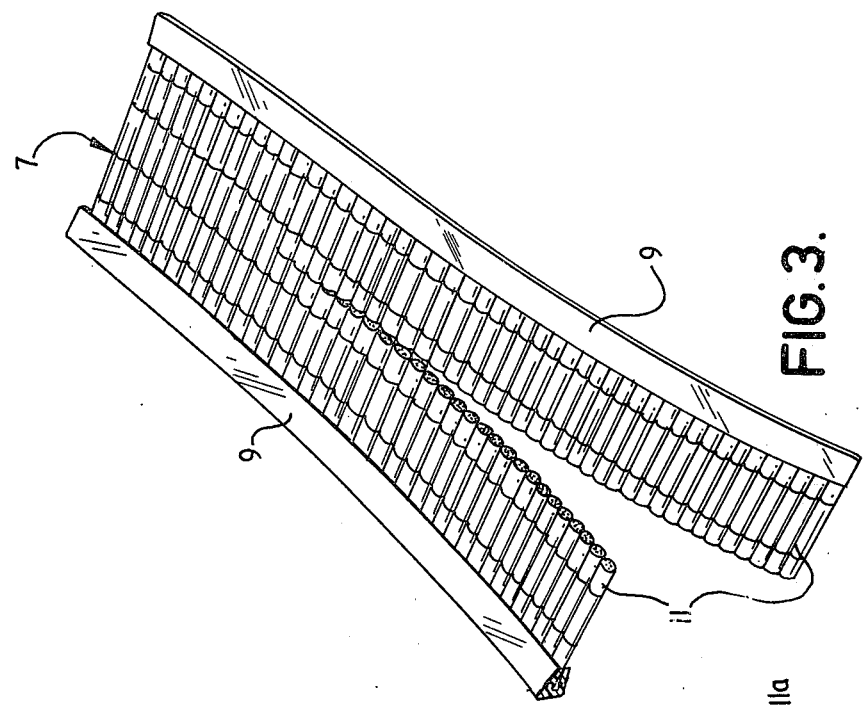
FIG. 3 is a similar view to FIG. 2, but of a further embodiment.

In the embodiment of FIG. 3, the fabric 7 is fairly narrow, is slit into two strips 11, and beads 9 are extruded onto the outer edges. Normally, the strips shown in FIG. 2 would then be slit centrally as in this embodiment.

Figure 4A:
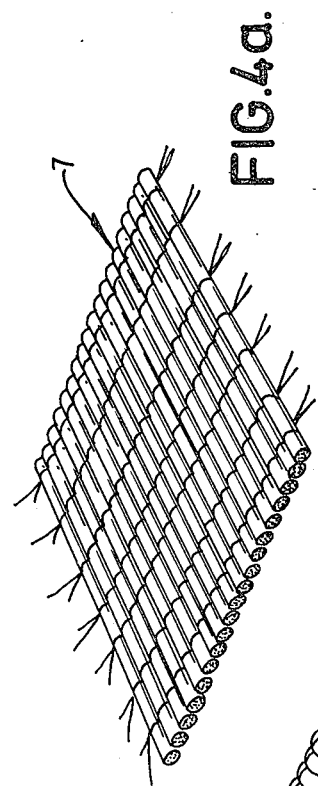
FIGS. 4a–4c show three stages in the formation of of a yet further embodiment of brush strip.
Figure 4B:
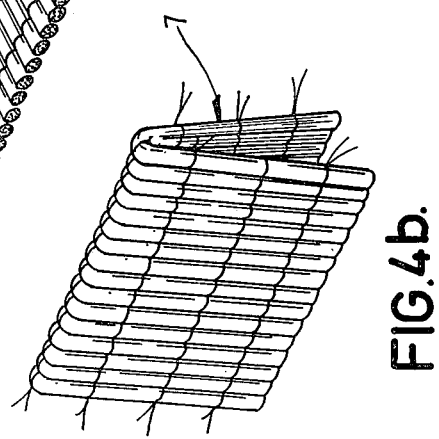
Figure 4C:
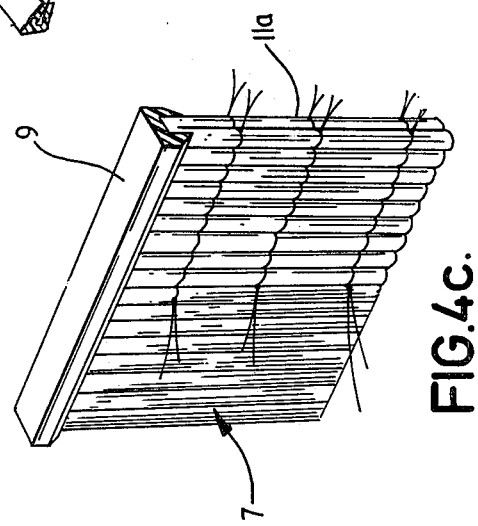

In the embodiment of FIGS. 4a–4c, the woven fabric 7 is folded through approximately 180° as shown in FIG. 4b so as to provide a double thickness, and is then fed into an extruder (not shown), and a bead 9 is extruded onto the folded-over end. A double thickness brush strip 11a results. As in the other embodiments, in the vicinity of the bead 9, the bristle filaments are fused together and become integral with the bead 9.

Figure 5:
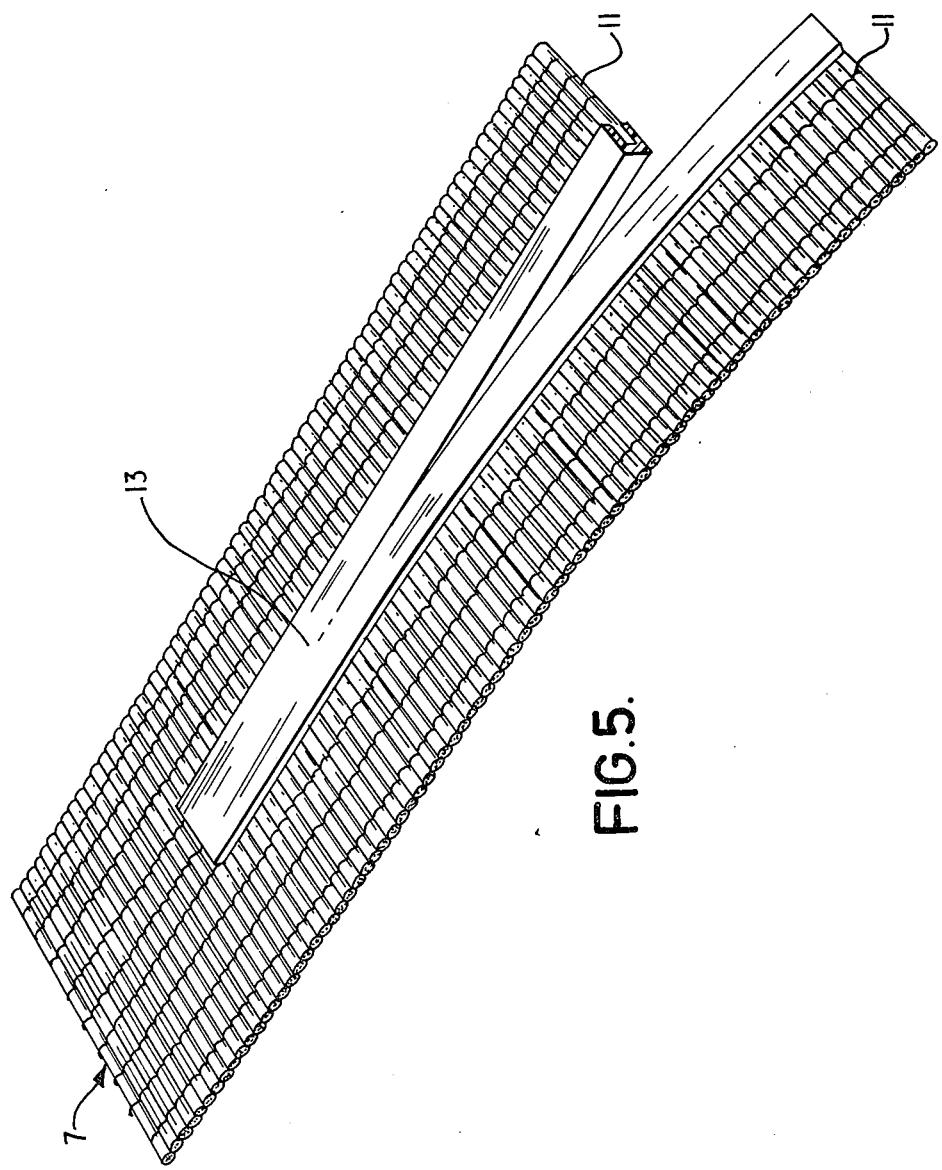
FIG. 5 is a view similar to FIG. 3 of a fifth embodiment.

In the FIG. 5 embodiment, the bristle fabric 7 has a wide bead 13 extruded onto its central area as it is advanced through an extruder (not shown), the extrusion being such as fully to impregnate between and fuse with the bristles (it may be extruded from both faces of the fabric 7), and the bead 13 is then slit centrally by a slitter (not shown) to provide two beaded strips 11.

In all the above constructions, the warps 5 can be removed from the components or strips 11, preferably by pulling them out after the strips have been cut to length.

All the above described brush components or strips 11 can then be incorporated into a brush by locating the plastics beads 9 in a suitable re-entrant groove. If desired, several components could be used side by side and those several components could be of different densities. If desired, the plurality of side by side components could be connected together by fusing their beads 7 prior to assembly in the brush head.

By manufacturing brushes and their components using the above described weaving process, less twisting of the tow or weft occurs than if the components are manufactured by the knitting process described in our U.K. Pat. No. 1,457,074. Furthermore, good bristle density is achieved due to the action of the reed on the loom.

Also, there is less wastage from woven strips or tapes of brush component than some knitted tapes because often with knitted tapes the edges of the tape, where the yarn bundles at the ends of zig-zags are bent upon themselves, have to be slit. Furthermore, less deformation of the tows from the warp yarns occurs than with knitted brush components. It will also be appreciated that by using a weaving process there is considerable flexibility in the end product. For example, the thickness of the woven material can be altered merely by altering the characteristics of the wefts. What is more, the number of tows per weft can be adjusted to change thickness.

Furthermore, the characteristics of the wefts can be changed at will, e.g. the dimensions of the filaments making up the wefts can be changed or the number of filements per weft can be altered. Likewise, a combination of different wefts can be woven into the same fabric.

In most instances, it is envisaged that more than one strip of tape or brush component would be required per brush and normally speaking at least two tapes would be used together to increase bristle density. By off-setting these laterally with respect to each other, a uniform bristle density throughout the length of the brush can be achieved. It is envisaged, for example, that a single brush component could be doubled over lengthwise so that the bristles overlap to create a brush of half the width of the tape but twice the density.

A further advantage of weaving over knitting brush components is that in a loom, higher tension can be applied to the warps than in a knitting machine. This means that the warp yarns can be kept parallel and misalignment is less likely to occur.

It is envisaged that the extrusion and/or slitting and/or folding operations could be performed on the woven material soon after it emerges from the loom and before the material is reeled or stored on spools. To enable such operations to be performed, it is envisaged that the extrusion and/or slitting and/or folding equipment would be mounted on suitable slides over the material emerging from the loom. Instead of using traditional polymeric material for the extrusion operations, in which a die is attached to the extruder, it is envisaged that hot melt adhesive could be used and in the appended claims the expression "extruded" and similar expressions relating to extrusion operations should be interpreted accordingly.

It is envisaged that in certain circumstances it may be desirable to reinforce the woven brush component. This can be done by incorporating a strengthening member or carrier within the extrusion. This carrier may be in the form of a thread or wire either coated or uncoated. If a wire is used, this will enable the component to maintain any position into which it is bent.

Although it is preferred to extrude polymeric material onto the woven material 7, with certain polymeric filaments it is possible just to heat the filaments (tows) and fuse the bristle filaments together at chosen locations across the woven fabric 7, and subsequently form these fused areas into a bead. As before, the woven material is also slit into strips.

What is claimed is:

1. A method of manufacturing brush components comprising forming a multifilament tow from synthetic resinous bristle filaments, feeding the tow in one direction to a loom as the weft, weaving from the tow a bristle fabric extending in a direction transverse to the one direction by using traditional warp yarns, feeding the fabric in the transverse direction through an extruder to cause portions of the synthetic resinous bristle wefts in the vicinity of the extruder heads to be heated to a temperature sufficient to at least soften them, and extruding onto the fabric across the softened portions of the bristle wefts as the fabric is fed through the extruder, at least one strip of a polymeric material, the extruded polymeric material and the softened portions of the bristle wefts fusing together during the extruding step to lock them together.

2. A method according to claim 1 wherein the warp yarns are formed from a polyester material.

3. A method according to claim 1 comprising after the weaving operation, the further steps of slitting the woven material transverse to the wefts, and the molten plastics material is then extruded onto one end of the severed wefts during the extruding step, the shape of the extrusion being such as to provide a locking bead which can subsequently be located in a groove in a brush head.

4. A method according to claim 1 comprising after the weaving operation, the further step of slitting the woven material transverse to the wefts, and the molten plastics material is then extruded onto both ends of the severed wefts during the extruding step, the shape of the extrusion being such as to provide a locking bead which can subsequently be located in a groove in a brush head.

5. A method according to claim 4 wherein the molten material is extruded down both end edges of the severed wefts, and then a further severing operation between the two extrusions is performed.

6. A method according to claim 1 comprising after the weaving operation, the further steps of slitting the woven material into strips, and folding a slit strip upon itself about its central line running transverse to the wefts, thus presenting a double row of weft ends side by side, the material then being held in this doubled-over configuration by extruding a bead of polymeric material along the fold line.

7. A method according to claim 1 wherein the woven material has extruded onto one or both faces thereof strips of molten polymer at selected points across the width of the woven tape to form brush beads, and then slitting the woven material between the strips of molten material so as to provide several single brush components either of the same or different widths.

8. A method according to claim 7 wherein the woven material is also slit down the centre of each strip of polymer.

9. A method according to claim 1 where in the step of feeding the fabric through the extruder, the synthetic resinous bristle wefts are heated to a temperature sufficient to fuse the bristle filaments together in the vicinity of the extrusion.

10. A method according to claim 1 wherein the bristle material and the extruded polymeric material are the same.

11. A method according to claim 1, wherein the component is cut to the desired length, and the warp yarns are then pulled out of the component.

* * * * *